Jan. 25, 1938.   V. J. LUONGO   2,106,252
DENTAL TOOL
Filed Dec. 31, 1936
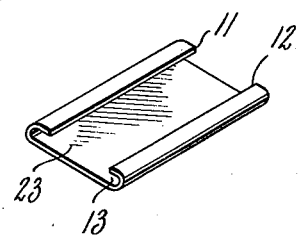
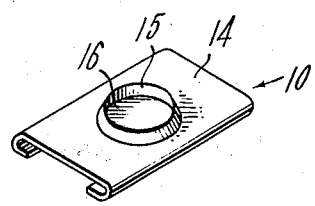
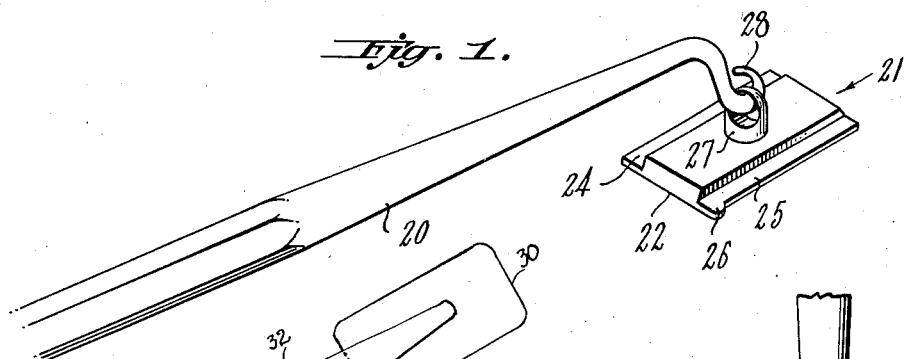
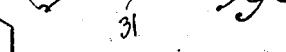
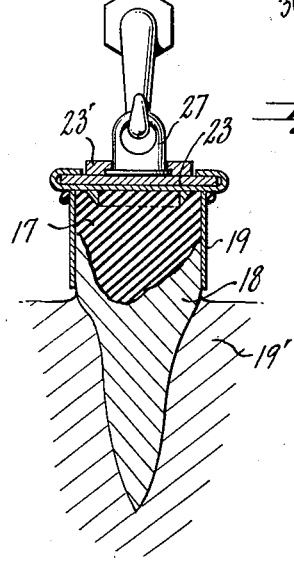
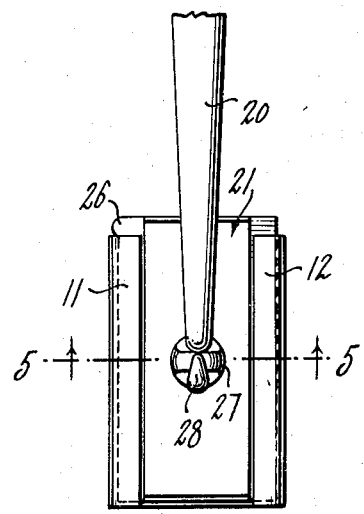
INVENTOR.
Vincent J. Luongo
BY Joseph F. Padlon
ATTORNEY.

Patented Jan. 25, 1938

2,106,252

UNITED STATES PATENT OFFICE 2,106,252

DENTAL TOOL

Vincent J. Luongo, Brooklyn, N. Y.

Application December 31, 1936, Serial No. 118,557

7 Claims. (Cl. 32—17)

My invention relates to dental tools and more particularly to a novel combination dental impression wax holder.

In the art of filling dental cavities with inlays, or making artificial dental bridgework, many devices are used for taking impressions thereof. Such devices do not retain the wax material in sufficiently rigid position to permit obtaining a clean cut impression of the part taken. Furthermore, when the impression is obtained, difficulty is experienced in removing the wax, with the impression made thereon, from the mouth without causing any break in the impression. Devices provided for such purposes generally remove the wax from the mouth in such a manner that the impression is distorted thereby necessitating repeated impressions.

In my former invention as disclosed in U. S. Patent 1,278,006 dated September 3, 1918, a dental tool was provided whereby an impression of the dental or like cavity could be obtained without permitting lateral displacement of wax material.

My invention contemplates a dental tool which will facilitate the taking of impression of dental cavities of teeth and of spaces intermediate the teeth by means of wax and like material suitable for such purposes without lateral displacement of the same.

My invention further contemplates the combined use of an easily adjustable dental tool adapted to retain the wax impression in rigid position while permitting easy and rigid removal of the same from the mouth.

The present invention also contemplates the provision of a removable handle adapted to take the wax with the impression thereon from the part of the mouth or teeth impressed.

In order to accomplish the recited features and objects and others coordinate therewith, a preferred embodiment of my invention generally resides in the novel arrangement and construction of parts shown in the accompanying drawing, and hereinafter described in detail and claimed.

In the drawing,

Fig. 1 is a perspective view of a part of the device,

Fig. 2 is a perspective bottom view of another part of the device,

Fig. 3 is a top perspective view of the part shown in Fig. 2,

Fig. 4 is a plan view of the device,

Fig. 5 is a view taken on line 5—5 of Fig. 4 of the combination device as used in connection with an impression of a tooth, and Fig. 6 is a plan view of a modification of the part shown in Fig. 1.

In the drawing like numerals refer to like parts thruout.

Referring to the drawing, which shows a preferred embodiment, in combination, of my invention a flat holder 10 is provided, having its opposed longitudinal marginal edges 11 and 12 respectively, turned over toward each other forming an open longitudinal slot 13 and an intermediate open space. The top 14 of said holder is provided with a beveled annular member 15 integral therewith. Said member is fixed to the top of the holder by any suitable means such as by sweating or welding and the like and is preferably disposed at the center thereof to form a central cylindrical recess 16 for anchoring a mass of thermoplastic material 17 when dental impressions are to be taken.

Said plastic material may be of wax or the like suitable for the purpose intended and is fixed into the recess by initially warming the same and by merely pressing the same into the recess. In order to prevent any lateral displacement of the wax and to hold the same when the impression of a tooth 18 is taken, cylindrical member 19 of metal or other resistant material is provided which surrounds the exterior of the tooth as in gum 19'. The member is retained in position against the top 14 of holder 10 by means of the wax and is adapted to fit snugly around the tooth of which an impression is to be made by the wax. Furthermore, the cylindrical member retains a sufficient quantity of wax whereby a clean cut impression of the cavity or other desired part of the tooth is obtained without any escape of wax from the member. The member 19 may be of any diameter for suitably fitting the outside of any tooth, the cavity of which is to be impressed.

In many cases, however, it has been found advantageous to initially use the cylindrical member containing the wax therein, for making the impression, whereupon the holder 10 is warmed and imbedded against the exposed end of the member 19 to take up the wax. It is to be noted that a well defined impression is essential in faultless fitting in the tooth.

As part of the invention as embodied herein, I provide a removing handle 20 onto which is connected a slide member 21. The underface 22 of said member 21 is smooth and flat to permit frictional contact with the flat bottom portion of piece 22, when the member is slid into relative engagement as shown in Figs. 4 and 5.

Mounted onto the flat bottom piece 23 is a reduced member 23', thereby forming opposed parallel longitudinal reduced edges 11 and 12 respectively of the holder 10 and form an engagement therewith. One of said edges in the slide member 21 is provided with an enlarged end portion 26 which acts as a stop when the slide is in engagement with the holder 10, preparatory to removing the impression from the tooth as shown in Fig. 5.

It is to be noted that interconnecting handle 20 and slide member 21, I have provided a rotatable member 27 which is mounted in the top reduced member of slide member thus permitting positioning of handle member 20 in any manner to effect removal of the wax without damaging the impression made of the dental cavity as shown. The handle 20 is provided with a looped end portion 28 in connection with the rotatable pivotal member 27, so that effective pull can be exerted at any angle without discomfort to the patient when the impression is taken. Such type of handle and engaging member as disclosed and shown is easy to use and can be easily removed from holder 10. It is to be further noted that by such engagement an impression may be removed from any tooth in the mouth since the pivotal member 27 permits free rotary and angular movement of the handle 20.

From the foregoing description of a preferred embodiment of my invention, taken in connection with the accompanying drawing, it will be noted that a clean cut impression of a dental cavity and the like is obtained thereby. Furthermore, by my invention the formed impression may be easily withdrawn from the tooth cavity without damaging the lines of formation and the parts easily sterilized for continuous and ready use.

In Fig. 6 of the accompanying drawing I have shown a partial plan view of a handle member consisting of a slide 30, a stop 31 and a handle section 32 adapted to fit into the holder 23. Since the latter is to be combined with the wax material 17 and circular member 19 after an impression has been made of the dental cavity of tooth 18 by the use of the handle described above, it will not be necessary for the dentist to use his fingers when a dental impression is to be made of a tooth.

While a preferred embodiment is described, various modifications as to form, material use and arrangement of parts may be made without departure from the spirit and scope of the invention as defined.

I claim:

1. A dental impression wax holder comprising a handle, a slide member in pivotal connection with the handle, a holder for engagement with the slide member, and a cylindrical member mounted on the holder for retaining wax and adapted to surround a tooth to permit taking an impression of the cavity thereof.

2. A dental impression wax holder comprising an elongated handle, a slide member pivotally connected with the handle, a holder for engagement with the slide member having a circumferential extension in the center thereof for anchoring a wax mass for obtaining a dental impression, and a cylindrical member mounted on the holder concentric with the extension for surrounding a tooth and for retaining wax therein to permit taking an impression of a cavity in the tooth.

3. A dental impression wax holder comprising an elongated handle member, a slide member provided with a plurality of opposed longitudinal recessed edges, a holder member adapted to form a sliding engagement with the slide member at the longitudinal recessed edges, a pivotal member mounted in the slide member and integral therewith interconnecting the handle and the slide member, a cylindrical member mounted on the holder for surrounding a tooth and for retaining a wax therein to permit obtaining of an impression of a cavity therein, and a concentric extension in the holder for anchoring the wax against the holder.

4. A dental impression wax holder, comprising a holder member having a pair of spaced, opposed, turned over end portions forming an open slot, a circular member mounted on the opposite face thereof, a cylindrical member concentric with the circular member mounted on the holder and adapted to surround a tooth and for retaining a wax therein for taking an impression of a cavity in said tooth, a slide member having opposed longitudinal recessed edges adapted to form a sliding engagement with said holder in the open slot thereof, and a handle member pivotally connected with the slide member for permitting tractile pull of the wax in the holder with the impression taken of the dental cavity without distortion of the same.

5. A dental impression wax holder, comprising a holder having its opposed longitudinal edges turned over to form a spaced, open slot on one side, a centrally mounted circular member on the other side of the holder and integral therewith for anchoring wax and the like against the holder, a cylindrical concentric member adapted to contain a wax and surround a tooth and thereby prevent lateral displacement of the wax during the taking of an impression of the cavity of said tooth, a sliding member having recessed edges adapted to fit in said open slot and form a sliding engagement with the holder, one end of said sliding member being provided with an angularly extending edge portion for limiting the movement of the sliding member in the open slot, an elongated handle for said sliding member, a pivotal member mounted in the sliding member interconnecting the same and the handle member to permit the engagement of the sliding member and the holding member at any desired angle to withdraw the wax impression on the holder without any distortion of the same.

6. A dental wax impression device, comprising an elongated handle, a slide member in connection with the handle having opposed parallel longitudinal edges and an edge portion angularly extending from one of said edges, and a holder having an open slot on its under face to permit insertion of the slide member and form an engagement with the reduced edges of the slide, said holder having mounted thereon a cylindrical member adapted to carry a moldable wax therein and to surround a tooth to permit taking an impression of the cavity thereof with a minimum of lateral displacement of the wax in the holder during the impressing operation.

7. A dental impression wax holder comprising an elongated handle provided with a downwardly curved looped end portion, a slide member having reduced opposed parallel, longitudinal edges, a rotatable loop member interconnecting the handle and slide, and a holder having an open slot on its under face to permit insertion of the slide member and forming an engagement along the reduced edges of the slide, said holder having mounted thereon a cylindrical member adapted to carry moldable wax therein and to surround a tooth to permit taking an impression of the cavity thereof with relatively little lateral displacement of the wax in the member during the impressing operation.

VINCENT J. LUONGO.